May 11, 1926. 1,584,633
H. E. MIEBACH ET AL
SEALING DEVICE FOR THE VALVE STEM OPENINGS OF WHEEL RIMS
Filed Jan. 16, 1924
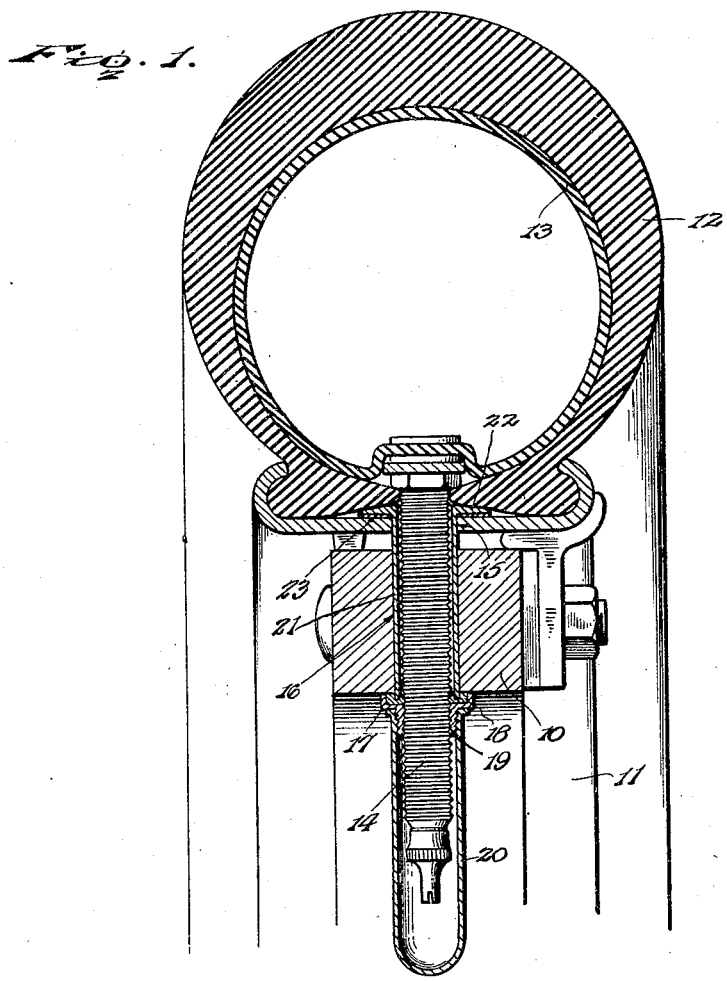
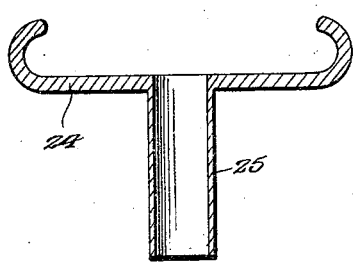
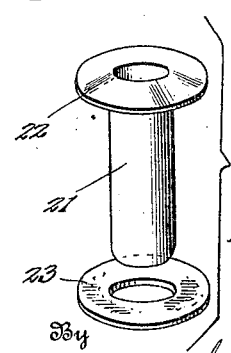
Inventors
H. E. Miebach.
B. Chaplin.
By Lacy & Lacy, Attorneys Patented May 11, 1926.

1,584,633

UNITED STATES PATENT OFFICE.

HENRY E. MIEBACH AND BASIL CHAPLIN, OF LETHBRIDGE, CANADA.

SEALING DEVICE FOR THE VALVE-STEM OPENINGS OF WHEEL RIMS.

Application filed January 16, 1924. Serial No. 686,635.

This invention relates to an improved sealing device for the valve stem openings of wheel rims and seeks, among other objects, to provide a device which may be readily applied to the rim of a motor vehicle wheel to prevent the entrance of water through the rim into the tire carried thereby about the valve stem of the tire.

The invention seeks, as a further object, to provide a device which may be readily employed in connection with rims and tires of different makes and will thus be adapted for general use.

And the invention seeks, as a still further object, to provide a device which will be characterized by extreme structural simplicity and may thus be produced and sold at moderate cost.

Other and incidental objects will appear hereinafter.

In the drawings:

Figure 1 is a sectional view showing our improved device in use,

Figure 2 is a detail perspective view of the device, and

Figure 3 is a detail sectional view showing a slightly different embodiment of the invention.

Under present practice, a nut is, as is well known, threaded upon the valve stem of a motor vehicle tire, after the tire has been applied to the wheel, to abut the inner circumferences of the wheel felly for closing the valve stem opening through the felly as well as rigidly securing the valve stem against canting movement and consequently preventing creeping of the inner tube of the tire. However, while the valve stem opening through the felly is thus closed by the nut, the valve stem opening through the wheel rim, nevertheless, remains open, so that water may enter through the rim into the tire around the valve stem. Rusting of the rim beneath the beads of the tire casing as well as beneath the inner tube consequently ensues with resultant damage to the inner tube while the fabric of the casing becomes water soaked and accordingly rots. The present invention, therefore, seeks to provide a simple and efficient device for overcoming these disadvantages. In the drawings, we have, for convenience, shown the invention in connection with a conventional motor vehicle wheel, wheel rim and tire. The wheel felly is indicated at 10 and removably surrounding the felly is the rim 11 accommodating a tire casing 12. Enclosed by the casing is an inner tube 13 carrying the usual valve embodying a valve stem 14 which is freely received through an opening 15 in the rim and through an opening 16 in the wheel felly in the customary manner. Threaded upon the stem to abut the inner circumference of the felly is a nut 17 locking the stem against tilting movement within the opening 16 and this nut carries the usual gasket 18 for sealing said opening at its outer end. The nut is formed with an upstanding nipple 19 and screwed upon said nipple is the usual dust cap 20.

Coming now more particularly to the subject of the present invention, we employ a cylindrical sleeve 21 which is of a diameter to snugly but slidably fit through the opening 15 in the rim 11 as well as through the opening 16 in the felly 10, freely accommodating the valve stem 14 therethrough, and formed on said sleeve at its inner end is an annular flange 22 to overlie the outer face of the rim beneath the beads of the tire casing 12. The flange 22 is preferably provided with a convex outer face to confront the beads so that the flange will not cause any injury thereto while the inner face of the flange is flat and surrounding the sleeve to rest against said flat face of the flange between the flange and the rim 11, is an appropriate gasket 23 sealing the opening 15. Preferably, the sleeve is of a length to project slightly beyond the inner circumferences of the felly 10 so that when the nut 17 is applied, the gasket 18 will be compressed over the outer end of the sleeve for closing the opening 16 of the felly at its adjacent end as well as sealing the outer end of the sleeve. Thus, water, dirt, or other foreign matter will be prevented from entering the tire through the opening 15 of the rim. As will be appreciated, the beads of the tire casing will, when the tire is inflated, be caused to bear against the flange 22 of the sleeve for compressing the gasket 23 and feeding the gasket toward the sleeve to maintain a sealed joint between the sleeve and rim, and endwise movement of the sleeve independently of the stem 14 under the thrust of the beads upon the flange 22 of the sleeve, will further serve to sink the outer end of the sleeve into the gasket 18 of the nut to maintain the sealed joint between the nut, sleeve and valve stem. Accordingly, at no time can any moisture gain entrance into the tire at the valve stem.

In Figure 3 of the drawings, we have illustrated a slightly different embodiment of the invention wherein a rim is shown at 24. In this embodiment, the valve stem sleeve, instead of being formed separate from the rim, as in the prior embodiment of the invention, is formed integral therewith, as indicated at 25. The sleeve 25 will, of course, be of a length to project through the wheel felly, so that when a nut, like the nut 17, is applied to the valve stem, the gasket of said nut will cooperate with the outer end of the sleeve to form a sealed joint between the sleeve, nut and stem.

Referring again to Figure 1 of the drawings, it should be stated that the device is, of course, applicable for use with so-called straight side rims and tires and when so used, the customary plate at the base of the valve stem of the inner tube of the tire would, when the tire was inflated, bear against the flange 22 for pressing said flange against the rim.

Having thus described the invention, what is claimed as new is:

1. The combination with a wheel rim, a felly mounting the rim and having a radial opening, an inflatable tire carried by the rim, and an inflating valve having a stem extending from the tire through the rim and through the opening in the felly, of a sleeve sealed to and carried by the rim and extending through the opening in the felly around the stem of the inflating valve, a nut threaded on the stem of the inflating valve adjacent the inner end of the sleeve, and a gasket carried by the nut and extending across the inner end of the sleeve and against and across the opening in the felly whereby to be compressed by the nut and close the space between the sleeve and the valve stem and the opening in the felly around the sleeve.

2. The combination with a wheel rim having an opening, a tire carried by the rim, and a tire inflating valve having a stem extending through the opening in the rim, of a sleeve inserted through the opening in the rim to surround the valve stem and provided at its outer end with a lateral flange lying between the tire and the rim, and a gasket interposed between said flange and the rim whereby the tire when inflated will press said flange against the gasket to compress the gasket and seal the joint between the rim and the sleeve.

In testimony whereof we affix our signatures.

HENRY E. MIEBACH. [L. S.]
BASIL CHAPLIN. [L. S.]